Oct. 19, 1965 L. GRASSL ETAL 3,212,159

METHOD OF PRODUCING MINIATURE SEMICONDUCTOR STRUCTURES

Filed Aug. 22, 1960

3,212,159

METHOD OF PRODUCING MINIATURE SEMICONDUCTOR STRUCTURES

Ludwig Grassl, Hohenaschauer-Strasse 54, and Karl Siebertz, Brehmstrasse 22, both of Munich, Germany Filed Aug. 22, 1960, Ser. No. 149,798
Claims priority, application Germany, Aug. 26, 1959, S 64,588
(Filed under Rule 47(a) and 35 U.S.C. 116)
1 Claim. (Cl. 29—25.3)

This invention is concerned with a method of producing miniature semiconductor structures comprising a plurality of electrodes, for example, transistors.

An important tendency to be observed in the development of semiconductor structures goes in the direction of reducing the size thereof. This tendency is of interest in connection with the use of the structures in small appliances and also in connection with transistors to be operated with high limit frequency. Very high requirements are in such cases posed with respect to the precision of the tools and the production devices to be used.

The object of the invention is to make the semiconductor structures of desired small size by means of tools and devices which are produced in simple manner.

In accordance with the invention, there is first produced an initial system with the desired number of electrodes and such initial system is thereupon subdivided into a plurality of semiconductor structures by cutting along lines extending through all electrodes.

The production of semiconductor structures of smallest dimensions, for example, transistor systems, is accordingly achieved by making miniature semiconductor structures by mechanically subdividing larger semiconductor systems, thereby facilitating manufacture thereof.

The various objects and features of the invention will appear from the description which will be rendered below with reference to the accompanying drawing, in which FIG. 1 shows the initial system produced in accordance with the invention;

Figure 1:
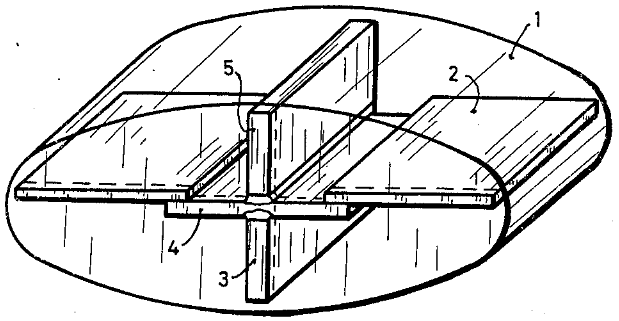

Referring now to the drawing, a transistor system is in known manner produced in a relatively large and therefore more easily controlled size, for example, in accordance with the so-called alloying method. In the initial transistor system represented in FIG. 1, numeral 4 indicates the semiconductor body having the individual electrodes, that is, the emitter and collector electrodes 3 and 5 and the base electrode 2 alloyed thereto. This initial system is embedded in a suitable mass, preferably synthetic material, forming a support therefor.

The parts of the initial system extend in one direction approximately rectilinearly and can be cut in perpendicular direction to form a plurality of miniature semiconductor elements. Accordingly, in the structure shown in FIG. 1, the terminals required for the contacting of the individual electrodes are initially formed in planes extending in parallel to the principal axis of the entire system.

Figure 2:
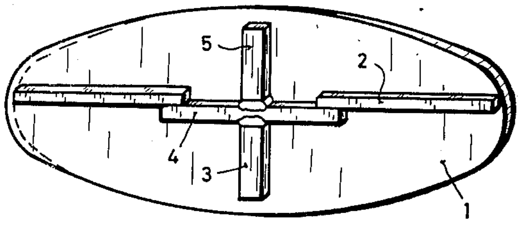
FIG. 2 shows a semiconductor structure cut from the initial system.

The miniature systems or structures are obtained from the larger initial system by cutting therefrom disks of desired thickness, for example, by means of a saw or other cutting devices as for example, electro corrosion, by means of an electron beam. A cutting plane is indicated in FIG. 1 in dash lines. The cutting is facilitated by the enveloping mass 1. FIG. 2 illustrates a disk cut from the system shown in FIG. 1.

Figure 3:
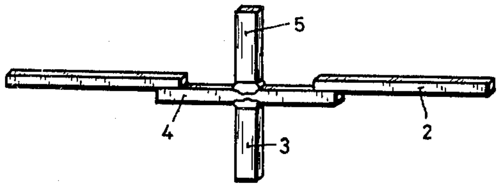
FIG. 3 illustrates a semiconductor structure produced according to the invention.

The embedding or enveloping material 1 can be removed by suitable dissolving agents prior to the further processing of the separated miniature elements. By proper dimensioning of the electrode terminals in the initial system, there will be obtained in this production method a system complete for contacting, the terminals of which can be directly soldered to or welded to a casing or housing provided therefor. Such a structure, an example of which is shown in FIG. 3, has moreover the advantage that the capacities of the electrode terminals are reduced to a minimum.

It is, however, also possible to subject the semiconductor element shown in FIG. 2, including the synthetic supporting material, cut off from the initial system illustrated in FIG. 1, to further processing, for example, for building into printed circuits. The semiconductor structure, for example, a transistor, is for this purpose formed to comply with the standards for the corresponding printed circuit.

The semiconductor structure produced according to the invention, especially a transistor, after etching off and protectively covering the cutting surfaces, can be built into a housing containing in addition thereto component parts of the printed circuit. The transistor structure can accordingly be included in a vacuum-tight housing together with other structural elements, for example, resistors and diodes.

Changes may be made within the scope and spirit of the appended claim which define what is believed to be new and desired to have protected by Letter Patent.

We claim:

A method of producing a large number of small similar individual transistor systems of like type, each having a small semi-conductor body and a plurality of at least three electrodes, such as base, emitter and collector electrodes, comprising the steps of first producing an initial system of the same type as the small individual systems, but which is large in comparison to such small individual systems, said initial system including a plate-like semi-conductor element extending rectilinearly in one direction, securing to said semi-conductor element a plurality of plate-like electrode members corresponding in number to the number of electrodes present in the individual systems to be produced, with said plate-like members extending in said direction to the full effective length of said semi-conductor element, with the planes of the respective plate-like members extending parallel to the axis of the system, subdividing said large system to form a plurality of small individual transistor systems by cutting said large system solely along planes extending perpendicular to said axis of the system, and lying successively in said one direction, whereby each cut forms an individual semi-conductor system comprising a section of said semi-conductor element and a section of each of said electrodes previously assembled therewith, and thereafter etching the cut surfaces of the small individual systems formed in the subdivision of said large system.

References Cited by the Examiner

UNITED STATES PATENTS

| | | | |
|---|---|---|---|
| 175,862 | 4/76 | King | 90—59.8 |
| 1,349,955 | 8/20 | Harwood | 90—59.8 |
| 2,135,047 | 11/38 | Carpenter | 90—59.8 |
| 2,328,302 | 8/43 | Simison | 90—59.8 |
| 2,511,962 | 6/50 | Barnes | 90—59.8 |
| 2,948,050 | 8/60 | VanVessem et al. | 29—25.3 |
| 2,998,556 | 8/61 | Pritchard | 29—25.3 |
| 3,076,253 | 2/63 | Cornelison | 29—25.3 |

FOREIGN PATENTS

| | | |
|---|---|---|
| 817,378 | 7/59 | Great Britain. |

RICHARD H. EANES, Jr., *Primary Examiner.*

THOMAS E. BEALL, WHITMORE A. WILTZ, *Examiners.*